(12) United States Patent
Revis

(10) Patent No.: US 6,504,798 B1
(45) Date of Patent: Jan. 7, 2003

(54) APPARATUS AND METHOD FOR PROVIDING UNINTERRUPTED CONTINUOUS PLAY DURING A CHANGE OF SIDES OF A DUAL-SIDED OPTICAL DISK

(75) Inventor: Paul A. Revis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/176,261

(22) Filed: Oct. 20, 1998

(51) Int. Cl.[7] ................................................. G11B 7/00
(52) U.S. Cl. ............................. 369/30.23; 369/30.27; 369/195; 386/126
(58) Field of Search ................. 369/32, 30.23, 369/30.27, 195; 360/61, 63; 386/126, 125

(56) References Cited

U.S. PATENT DOCUMENTS

| | | | |
|---|---|---|---|
| 4,519,055 A | | 5/1985 | Gilson |
| 4,807,208 A | | 2/1989 | Geiger |
| 5,067,116 A | | 11/1991 | Kadrmas |
| 5,099,465 A | | 3/1992 | Geiger |
| 5,153,862 A | | 10/1992 | Taylor et al. |
| 5,214,628 A | | 5/1993 | Langman et al. |
| 5,235,575 A | * | 8/1993 | Han ......................... 369/32 R |
| 5,235,579 A | | 8/1993 | Ross |
| 5,257,111 A | | 10/1993 | Kakuyama |
| 5,448,373 A | | 9/1995 | Kim |
| 5,502,703 A | * | 3/1996 | Yamada et al. ........... 369/32 X |
| 5,559,776 A | * | 9/1996 | Ikenaga ....................... 369/47 |
| 5,561,657 A | | 10/1996 | Ogawa |
| 5,613,745 A | | 3/1997 | Cho et al. |
| 5,615,184 A | | 3/1997 | Tsuruta et al. |
| 5,671,196 A | | 9/1997 | Yoshida et al. |
| 5,682,364 A | | 10/1997 | Ogawa |
| 5,692,878 A | | 12/1997 | Freund |
| 5,719,725 A | | 2/1998 | Nakao |
| 5,748,585 A | * | 5/1998 | Tsukamoto et al. ........... 369/47 |
| 5,754,502 A | | 5/1998 | Kamemura |
| 5,761,160 A | | 6/1998 | Sanada |
| 5,852,593 A | * | 12/1998 | Ishida et al. .................. 369/54 |

OTHER PUBLICATIONS

Klein, U.S. patent application Ser. No. 09/199,768, filed Nov. 25, 1998.*
Klein, U.S. patent application Ser. No. 09/200,320, filed Nov. 25, 1998.*
http://www.videodiscover.com/vdyweb/dvd/dvd-faw.html#1.1, General DVD, accessed Oct. 1, 1998.

* cited by examiner

*Primary Examiner*—Aristotelis M. Psitos
(74) *Attorney, Agent, or Firm*—Perkins Coie LLP

(57) ABSTRACT

An apparatus and method for providing continuous uninterrupted playback of a dual sided optical disk during side-to-side changing of the optical disk. The point at which a dual-sided optical disk will be switched between sides is determined. At some point prior to the switching of sides of the disk, a portion of the data at the end of the first side of the disk is transferred to a memory. During the switching of the disk to the second side, the stored data is read out from the memory to provide uninterrupted continuous playback of the optical disk.

49 Claims, 3 Drawing Sheets

APPARATUS AND METHOD FOR PROVIDING UNINTERRUPTED CONTINUOUS PLAY DURING A CHANGE OF SIDES OF A DUAL-SIDED OPTICAL DISK

BACKGROUND OF THE INVENTION

1. Field of the Invention

The present invention relates generally to an optical disk system for playing back signals from a recorded media, and more particularly to a video disk apparatus which provides uninterrupted continuous playback of a dual-sided optical disk during the period of switching from one side of the disk to the other side of the disk.

2. Description of the Related Art

Generally, optical disks have tracks that can record and play back various types of data. Common optical disks include compact disks (CDs), CD-ROMs, digital video disks or digital versatile disks (DVDs), or other similar disks. Some optical disks, such as DVDs, may be either single-sided or dual sided, i.e., data may be stored on only one or both sides of the disk.

In the situation where data is stored on both sides of the optical disk, the optical disk must be "flipped" from one side to the other in order to read data from both sides of the disk, or the playback apparatus must be capable of reading both sides of the disk without the disk being "flipped" over. Generally, a conventional optical disk recording and playback device uses one optical pickup to record or playback data on the tracks of a side of the disk adjacent to the optical pickup. Upon completion of the recording and playback of data on the side of the disk adjacent to the optical pickup, the disk is flipped, either by human manual intervention or an automatic changing device, to access the data from the other side of the disk. The manual flipping of the disk may require that the disk be taken out of the optical disk recording and playback device and then reinserted back into the optical disk recording and playback device.

In the case of an optical disk recording and playback device which has an automatic changing device, a rotatable transfer mechanism may be used to load a disk to an optical reader. The optical pickup is located within the optical reader to access the data on the side of the disk facing the optical pickup. When the first side of the disk has been read by the optical pickup, the disk will be transferred from the optical reader back into the transfer mechanism, the transfer mechanism rotated about its axis, and the disk reinserted back into the optical reader with the second side facing the optical pickup.

However, there are limitations with respect to the operation of devices in which the disk is flipped, either manually or automatically. The reproduction of the video signals must be stopped while the disk is being flipped until the data on the second side of the disk can be accessed. As a result, a video picture is stopped on a screen for the period of time required for the disk to be flipped, thus interrupting a movie or game program stored on the disk.

Alternatively, devices have been developed in which the data on both sides of an optical disk can be continuously accessed without the need for manually or automatically flipping the disk. Such devices may employ either one or two optical pickups.

An example of a continuous both-side playback device utilizing a single pickup is illustrated in U.S. Pat. No. 5,257,111. The single pickup is adapted to read the video signals recorded on both sides of the video disk by moving along a U-shaped track from the center of the top side of the disk to the center of the bottom side of the disk around the edge of the disk. However, there are limitations associated with this type of device similar to those in which the disk is flipped. Namely, the reproduction of the of the video signals must be stopped during the time the second side of the disk is being accessed, i.e., while the pickup moves from the outer circumference of the lower side of the video disk to the inner circumference of the upper side of the video disk to read the video signals recorded on the upper side of the video disk after reading all the video signals recorded on the lower side of the video disk. As a result, a video picture is stopped on a screen for about 10–15 seconds, thus interrupting the movie or game program stored on the disk.

An example of a continuous both-side playback device utilizing two pickups is illustrated in U.S. Pat. No. 5,448,373. A first pickup is provided to read data from the top side of the disk, and a second pickup is provided to read the data from the lower side of the disk, thus removing the necessity for flipping the disk. During operation, the video disk is rotated in a counter-clockwise direction to read the video signals recorded on the lower side of the video disk. The rotation is then halted and reversed to a clockwise direction to read the video signals recorded on the upper side of the video disk. To overcome the problem of the time required to reverse the rotation of the video disk from the counter-clockwise direction to the cloclkwise direction (approximately 4–6 seconds) and the resulting stoppage of the video picture on the screen, both sides of the video disk are read and stored in a memory. The contents of the memory are then output so that the video signals from both sides of the disk can be successively reproduced with no discontinuity. However, this type of device requires an extensive amount of memory space to store the entire contents of both sides of the disk. The extensive amount of memory required results in both increased costs for the device and an increase in physical size of the device.

Therefore, although the conventional optical disk systems are capable of continuous playback of dual-sided optical disks, they do not provide an apparatus or method for uninterrupted continuous playback without utilizing an extensive amount of memory to store the entire data contents of both sides of the disk before playback. Thus, there exists a need for an optical disk system that is capable of continuously playing back signals from a double-sided recorded media without interruption when the side being read is switched, without requiring an extensive amount of memory space.

SUMMARY OF THE INVENTION

The present invention overcomes the problems associated with the prior art and provides a unique method and apparatus for providing uninterrupted continuous play of a dual sided optical disk during side-to-side changing of the disk.

In accordance with the present invention a portion of the data from the end of the first side of an optical disk is read and stored in a memory. During playback of the disk by the system, the data on the first side of the disk is read up to the point where the data has been stored in the memory. When this point has been reached, the data previously stored in the memory is read out to the system, and the disk or reading mechanism is simultaneously switched from the first side to the second side to allow access to data on the second side of the disk. When the data stored in the memory has completed being read out to the system, the disk or reading mechanism has already completed the switch from the first side to the second side. The data on the second side of the disk is then read in succession with the data stored in the memory. Since the data being read by the system does not have to stop during the switching of sides of the disk, the system provides uninterrupted continuous playback of the disk. Additionally, since only a small portion of the data needs to be stored in a memory, the size of the required memory location is minimized, thus reducing the hardware requirements of the system.

These and other advantages and features of the invention will become apparent from the following detailed description of the invention which is provided in connection with the accompanying drawings.

DETAILED DESCRIPTION OF THE PREFERRED EMBODIMENTS

The present invention will be described as set forth in the preferred embodiment illustrated in FIGS. 1–3. Other embodiments may be utilized and structural, logical or programming changes may be made without departing from the spirit or scope of the present invention.

Figure 1:
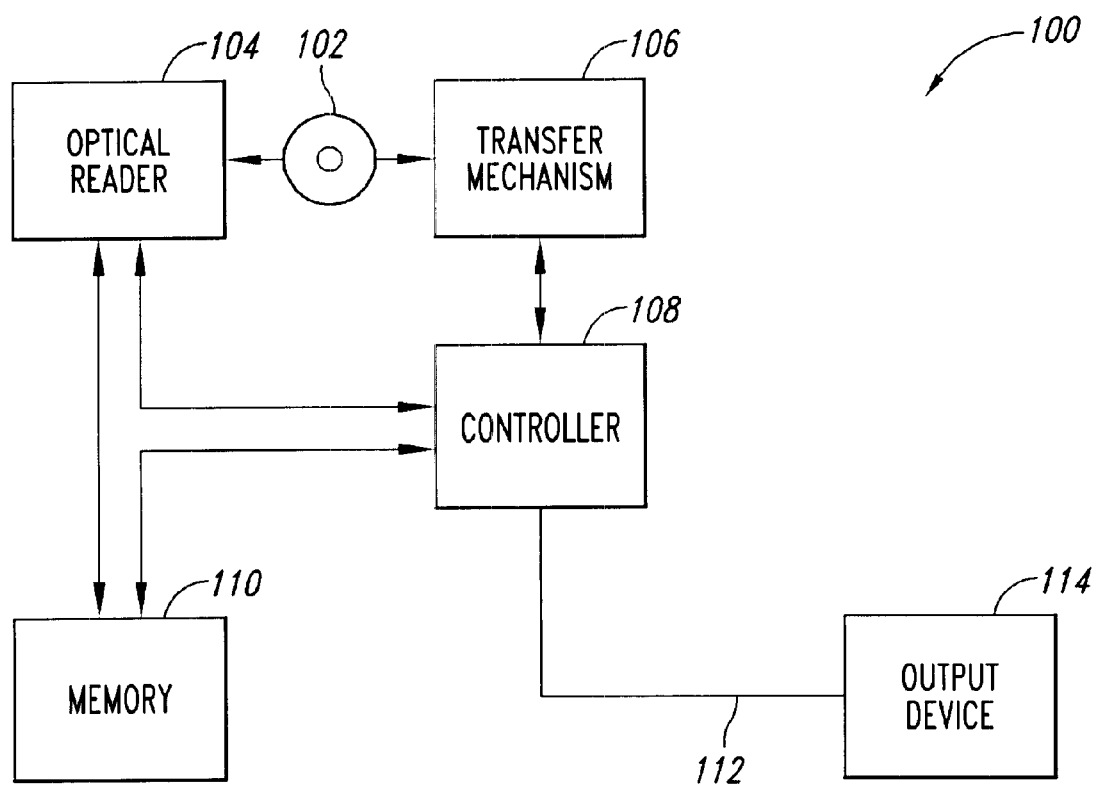
FIG. 1 illustrates in block diagram form an optical disk device capable of providing continuous uninterrupted playback of an optical disk during side-to-side changing of the disk in accordance with the present invention.

FIG. 1 illustrates generally in block diagram form an optical disk device 100 capable of providing continuous uninterrupted playback of an optical disk during side to side switching of the disk in accordance with the present invention. Optical disk device 100 generally includes a disk drive controller 108, a memory device 110, and an optical reader 104 for reading an optical disk 102. Optical disk 102 may be a compact disk (CD), CD-ROM, digital video disk or digital versatile disk (DVD), or the like. A transfer mechanism 106 may be provided for flipping the disk 102 to access both sides of the disk 102 in the case where it is dual-sided. Alternatively, the optical reader 104 may be able to rotate or may include means for accessing both sides of disk 102 without having to flip the disk by a transfer mechanism 106, or the device 100 may include any other method of accessing the second side of the disk 102. The data from the disk 102 is processed and output on output line 112, which may connect to an output device 114, such as a video monitor, computer, game device or other device or system which requires the data contained on optical disk 102.

Optical disk device 100 operates as follows. Optical disk 102 is inserted into optical reader 104. Optical reader 104 includes conventional sensors and electronics for reading optical disk 102. Controller 108 determines the point at which the reading of disk 102 will be switched between sides. Controller 108 may include a microprocessor. The microprocessor may be any conventional general purpose single- or multi-chip microprocessor. In addition, the microprocessor may be any conventional special purpose microprocessor such as a digital signal processor or a graphics processor.

The time required for the system to switch sides of the disk 102 to access the second side of the disk 102, whether it be by transfer mechanism 106 or some other means within optical reader 104 or within the device 100, is known based on the time required for operation of the transfer mechanism 106 and may be stored in a ROM within controller 108 or programmed directly into controller 108. Controller 108 will cause a transfer of a portion of data from the first side of the disk 102 to memory device 110. The portion of data transferred may be equivalent to an amount of data that, when read by the system, corresponds to the amount of time required for the optical disk device 100 to access the second side of the disk 102. Memory device 110 may be a dedicated memory device that is capable of storing the data read from disk 102, or may be part of a standard computer system allocated to store the data from disk 102.

When the device 100 is activated to playback the disk 102, the optical reader 104 starts to read data stored on the first side of the disk 102. When the beginning address of the data that has been transferred to memory 110 has been reached, the data previously transferred from disk 102 to memory 110 will be output by controller 108. While the data previously transferred to and stored in memory device 110 is being read, optical disk 102 is switched between the first side and the second side by transfer mechanism 106. Alternatively, if transfer mechanism 106 is not provided, the second side of disk 102 may be accessed by any method as known in the art.

The switching of sides of disk 102 will be completed at approximately the same time as or before the data stored in memory 110 has finished being read, since the amount of data transferred to memory 110 will require at least the same amount of time to be read out as it takes for the device 100 to switch reading between sides of disk 102. This provides for access to the data stored on the second side of disk 102 as soon as the data stored in memory 110 has been read out from device 100. For example, controller 108 may be used to monitor the address of the data as it leaves memory 110. When the last address of the data from the first side of disk 102 stored in memory 110 has been read out, controller 108 will cause optical reader 104 to commence reading data on the second side of disk 102 with the next sequential address. Thus, in accordance with the present invention, a seamless transition from a first side to a second side of an optical disk 102 is provided without having a video picture stopped on a screen for the period of tie it takes for the system to switch between sides of the disk 102. Additionally, since only a small portion of the data stored on the first side of the disk 102 is transferred to memory 110, the size of the memory 110 can be minimized to reduce the physical size and cost of the device 100.

Figure 2:
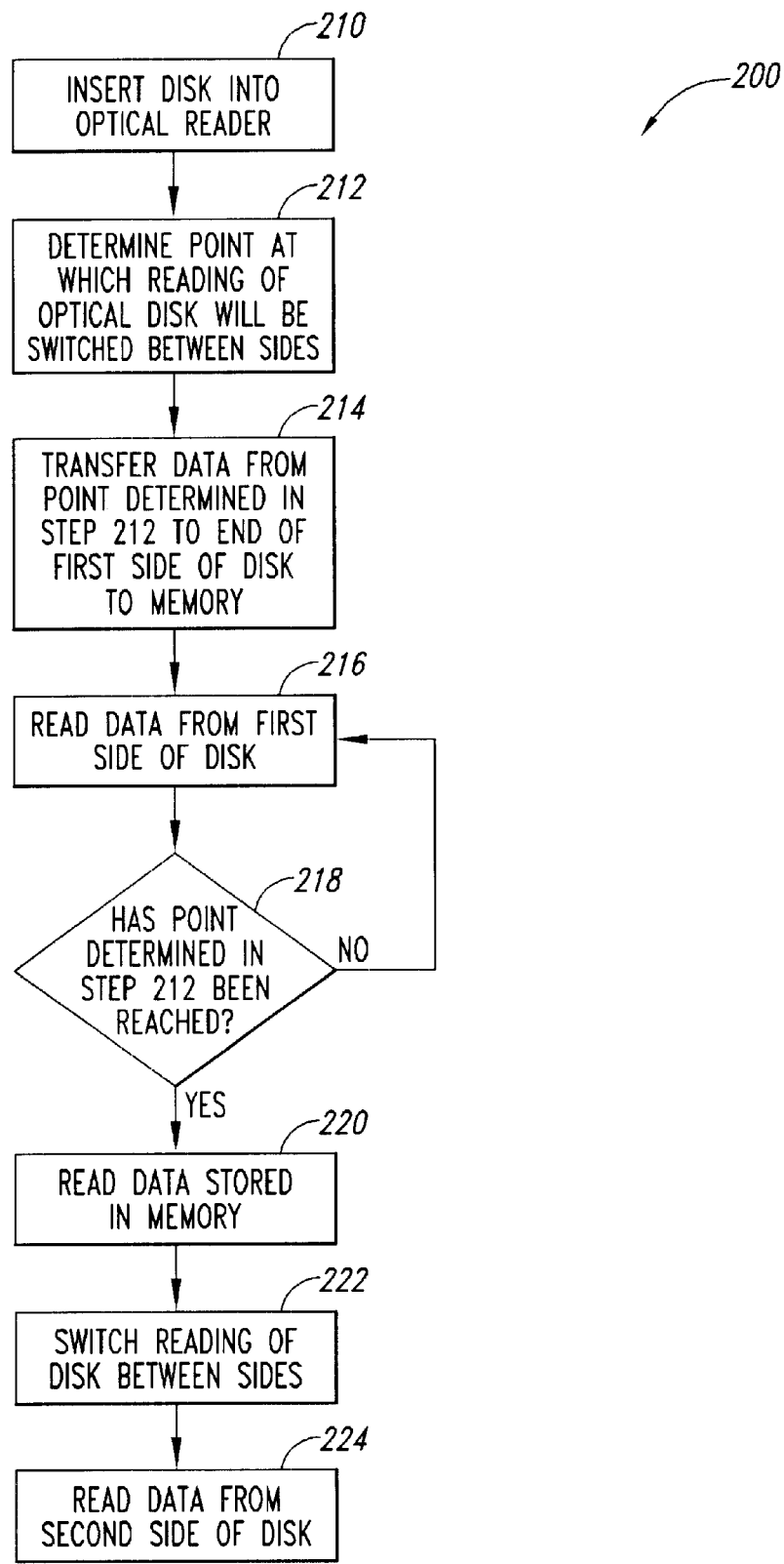
FIG. 2 illustrates in flow chart form a method of providing continuous uninterrupted playback of an optical disk during side-to-side changing of the disk in accordance with the present invention.

The method for providing uninterrupted continuous playback of a dual sided optical disk in accordance with the present invention is illustrated generally at 200 in FIG. 2. In step 210, a dual sided optical disk is loaded into an optical reader in any manner as is known in the art. The optical disk may be a compact disk (CD), CD-ROM, digital video disk or digital versatile disk (DVD), or any other such optical disk. The optical reader may be any type of optical reader as is known in the art, including readers with one or two optical pickups, and includes conventional electronics and sensors for reading an optical disk. Additionally, the optical reader may be used in any type of apparatus that utilizes any method for accessing both sides of a disk known in the art, including automatically flipping the disk or providing means for reading both sides of the disk without flipping the disk, to name a few.

When a dual sided optical disk is loaded into the optical reader, the data will typically be read from a first side and then a second side of the disk consecutively. In step 212, an address representing the point at which the reading of data from the optical disk will be switched from the first side to the second side is determined. The determination of this address point, as further described below, may typically be performed by a control circuit.

Once the determination of the point at which the reading of the disk will be switched between sides has been made in step 212, a portion of the data stored on the first side of the disk is read and transferred to a memory in step 214. The portion of the data transferred includes the data from the address point determined in step 212 on the first side of the disk up to and including the point at which the data ends on the first side of the disk. The determination of the point at which the reading of the disk will be switched between sides and resulting size of the portion of data stored in the memory is typically based on the functional capabilities of the optical disk system in which the optical reader is employed. The amount of data stored in the memory will require a certain amount of time to be read out from the memory. The amount of time required to read the data from the memory corresponds to the amount of time required for the optical disk system to switch the reading of the sides of the disk to allow access to the data stored on the second side of the disk. Thus, by varying the amount of data transferred to the memory, the amount of time required for the data to be read out of the memory can also be varied to coincide with the time required to switch sides of the disk.

For example, the optical disk system may incorporate a transfer mechanism that receives the disk after the first side has been played, flips the disk from the first side to the second side, and reinserts the disk back into the optical reader. Alternatively, the disk may be removed from the optical reader, the optical reader rotated about an axis, and the disk reinserted so the optical pickup faces the second side of the disk. This process may take a number of seconds, such as for example, 10 seconds. The determined address point on the disk at which point the reading of the optical disk will be switched between sides and the resulting portion of data to be stored in memory will be some address point prior to or equivalent to the address point at which there is 10 seconds of data left on the first side of the disk, such as for example 12 seconds. Thus, the size of the portion of data from the first side of the disk that is transferred to the memory may correspond to the amount of time required for the optical disk system to access the second side of the disk. Since the amount of time required to switch the reading of the data from the first side of the disk to the second side of the disk is known, the address point at which to start the data transfer can be easily determined by a controller in the system.

In step 216, the system starts to read the data from the first side of tie disk. The data is read by conventional sensors and electronics for reading an optical disk included in the optical reader. In step 218, the system determines whether the address of the determined point from which the data on the first side of the disk has been transferred to the memory has been reached. If the determined address has not been reached, the method continues reading the data from the first side of the disk in step 216. If the address of the determined point has been reached, the data that was previously transferred to the memory in step 214 is read out to the system. While the data previously transferred to the memory is read to the system in step 214, the reading of the disk is switched between sides in step 222.

The switching between sides of the reading of the disk in step 222 will be completed at approximately the same time as or before the data stored in the memory has finished being read in step 220, since the amount of data transferred to the memory will require at least the same amount of time to be read out as it takes for the system to switch reading between sides of the disk. This provides for access to the data stored the second side of the disk as soon as the data stored in the memory has been read out to the system. When the data stored in the memory has been read out to the system, the data from the second side of the disk is read in step 224.

Since data was read from the memory during the switching of the side of the disk being read, the data appears at a video screen which requires the output of the optical disk system to be continuous and uninterrupted. Thus, the method according to the present invention provides a seamless transition from a first side to a second side of an optical disk without having a video picture stopped on a screen for the period of time it takes for the system to switch reading the data between sides of the disk. Additionally, since only a small portion of the data stored on the first side of the disk is transferred to the memory, the size of the memory can be minimized to reduce the physical size and cost of the device. It is important to note that while the embodiment as described above determines the point at which the disk is to switch the reading of sides and transfers a portion of the data at the end of the first side of the disk before the data is read from the first side of the disk, the invention is not to be so limited. The determination of the point at which the disk will be switched between sides in step 212 and the transferring of the data to the memory in step 214 can occur at any time after the disk has been loaded into the optical reader, as long as it is performed prior to the time the point determined in step 212 has been reached in step 218.

Figure 3:
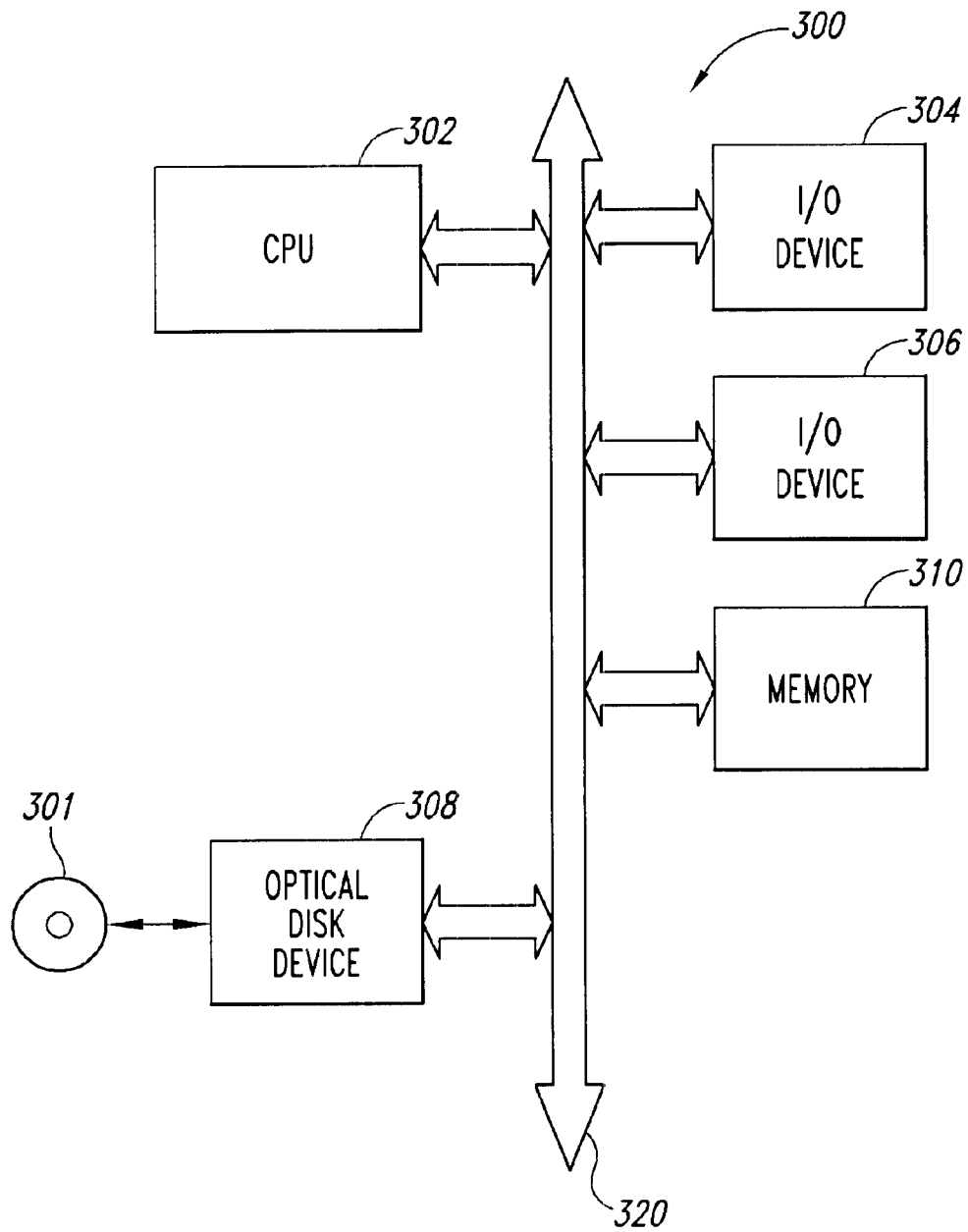
FIG. 3 illustrates in block diagram form a system in which the optical disk device in accordance with the present invention may be utilized.

FIG. 3 illustrates in block diagram form a processor system 300 in which an optical disk device according to the present invention may be utilized. Such a system could include a computer system, stereo system, video game system, or a television system, all of which can utilize the present invention.

A processor system, such as a computer system for example, generally comprises a central processing unit (CPU) 302 that communicates with an input/output (I/O) device 304 over a bus 320. A second I/O device 306 may also be provided. I/O devices 304, 306 may be, for example, a video display or speaker. An optical disk device 308 for reading data stored on an optical disk 301 also communicates with the system over bus 320. Optical disk device 308 may also be combined with a processor, such as a CPU, digital signal processor or microprocessor, in a single integrated circuit. The processor system 300 also includes a memory 310.

Processor system 300 is capable of providing continuous uninterrupted playback of a dual sided optical disk utilizing the method of the present invention as described with respect to FIG. 2. CPU 302 will determine a point at which reading of dual sided optical disk 301 by optical disk device 308 will be alternated between sides, and cause a portion of the data stored on the first side of the optical disk 301 to be read and stored in memory 310. When the data from the optical disk 301 is being read, the data stored in memory 310 will be read out to the system during the time the reading of optical disk 301 is switched between sides, thus providing continuous uninterrupted playback of optical disk 301.

Reference has been made to preferred embodiments in describing the invention. However, additions, deletions, substitutions, or other modifications which would fall within the scope of the invention defined in the claims may be found by those skilled in the art and familiar with the disclosure of the invention. Any modifications coming within the spirit and scope of the following claims are to be considered part of the present invention.

What is claimed as new and desired to be protected by Letters Patent of the United States is:

1. A method for reading a first and second side of a dual sided optical disk comprising:

determining a point when reading said dual sided optical disk should be switched from said first side to said second side;

storing a portion of data from said first side of said dual sided optical disk in a memory, said portion of data corresponding to an amount of time required to switch said reading of said dual sided optical disk from said first side to said second side and comprising data from said determined point on said first side of said dual sided optical disk up to an end of said first side of said dual sided optical disk;

reading data from said first side of said dual sided optical disk;

switching said reading of said dual sided optical disk from said first side to said second side when said determined point has been reached; and reading said data from said first side of said dual sided optical disk stored in said memory while said switching is occurring, reading said data stored in said memory taking an amount of time greater than an amount of time required to switch said reading of said dual sided optical disk from said first side to said second side.

2. The method according to claim 1, further comprising:

reading data from said second side of said dual sided optical disk after said data stored in said memory has been read.

3. The method according to claim 1, wherein said switching further comprises:

using a transfer mechanism to flip said dual sided optical disk.

4. The method according to claim 1, wherein said switching further comprises:

rotating an optical reader used to read said dual sided optical disk.

5. The method according to claim 1, wherein said switching further comprises:

moving an optical pickup from said first side of said dual sided optical disk to said second side of said dual sided optical disk.

6. The method according to claim 1, wherein said switching further comprises:

using a first optical pickup to read said first side of said dual sided optical disk; and using a second optical pickup to read said second side of said dual sided optical disk.

7. The method according to claim 1, wherein said determining a point when said reading said dual sided optical disk will be switched is performed by a disk drive controller.

8. The method according to claim 7, wherein said determining a point when said reading said dual sided optical disk will be switched includes using a microprocessor in said disk drive controller to determine a point when said reading said dual sided optical disk will be switched.

9. The method according to claim 1, wherein said storing a portion of said data in a memory includes storing a portion of said data in a dedicated memory device adapted to store said data from said dual sided optical disk.

10. The method according to claim 1, further comprising:

outputting said data read from said dual sided optical disk to an output device.

11. A method for providing uninterrupted continuous playback of data read from a first and second side of a dual sided optical disk comprising:

storing a portion of data from said first side of said dual sided optical disk in a memory;

reading data not included in said portion of data stored in said memory from said first side of said dual sided optical disk;

reading said portion of data stored in said memory after reading said data not included in said portion of data stored in said memory;

switching said dual sided optical disk from said first side to said second side concurrently with said reading said portion of data stored in said memory; and reading data from said second side of said dual sided optical disk after reading said portion of data stored in said memory.

12. The method according to claim 11, wherein said storing a portion of data includes storing a portion of data corresponding to data located at an end of said first side of said dual sided optical disk.

13. The method according to claim 11, wherein said storing a portion of data from said first side of said dual sided optical disk in a memory further comprises determining an amount of data to be included in said portion of data from said first side to be stored in said memory.

14. The method according to claim 13, wherein said determining includes using a processor to determine an amount of data to be included in said portion.

15. The method according to claim 13, wherein an amount of time required to read said data included in said portion of data stored in said memory corresponds to an amount of time required to switch said dual sided optical disk from said first side to said second side.

16. The method according to claim 13, wherein said switching said dual sided optical disk further comprises flipping said dual sided optical disk from said first side to said second side.

17. An apparatus for reading a first and second side of a dual sided optical disk comprising:

an optical disk reader;

a memory connected to said optical disk reader; and a controller cooperating with said optical disk reader and said memory to:

store a portion of data from said first side of said dual sided optical disk in said memory;

read data not included in said portion of data stored in said memory from said first side of said dual sided optical disk;

read said portion of data stored in said memory after reading said data not included in said portion of data stored in said memory;

switch said dual sided optical disk from said first side to said second side concurrently with said reading said portion of data stored in said memory; and read data from said second side of said dual sided optical disk after reading said portion of data stored in said memory.

18. The apparatus according to claim 17, wherein said controller determines a point on said first side of said disk when reading said dual sided optical disk should be switched from said first side to said second side.

19. The apparatus according to claim 18, wherein said portion of data stored in said memory comprises data from said determined point on said first side of said dual sided optical disk up to an end of said first side of said dual sided optical disk.

20. The apparatus according to claim 18, wherein said controller comprises a microprocessor.

21. The apparatus according to claim 17, wherein said dual sided optical video disk is a DVD.

22. The apparatus according to claim 17, further comprising:
a transfer mechanism to flip said dual sided optical disk from said first side to said second side.

23. The apparatus according to claim 17, wherein said optical disk reader rotates around an axis.

24. The apparatus according to claim 17, wherein said optical disk reader further comprises:
an optical pickup, said optical pickup being adapted to move from said first side of said dual sided optical disk to said second side of said dual sided optical disk to switch reading from said first side to said second side.

25. The apparatus according to claim 17, wherein said optical disk reader further comprises:
a first optical pickup to read data from said first side of said dual sided optical disk; and
a second optical pickup to read data from said second side of said dual sided optical disk.

26. The apparatus according to claim 17, wherein said memory is a dedicated memory device adapted to store data from said dual sided optical disk.

27. The apparatus according to claim 17, further comprising:
an output device connected to said controller to output said data read from said dual sided optical disk.

28. The apparatus according to claim 27, wherein said output device is a video display device.

29. An optical disk device for providing continuous uninterrupted playback of a dual sided optical disk having a first side and a second side, said device comprising:
an optical reader for reading the optical disk, the optical reader being adapted to spin the optical disk in a first direction and in a second direction;
a memory adapted to store data transferred from said dual sided optical disk; and
a controller cooperating with the optical reader and the memory to:
spin the dual sided optical disk in the first direction to enable reading data from the first side of the optical disk;
while the optical disk is spinning in the first direction, read a portion of data from the first side of the optical disk;
store said portion of data from the first side of the optical disk in a memory;
while spinning the optical disc in the first direction, read data from the first side of the optical disc not included in the stored portion of data;
read from the memory the stored portion of data after reading the data not included in the stored portion of data;
switch the optical disk from the first side to the second side concurrently with reading the stored portion of data from the memory, said switching including spinning the optical disk in a second direction; and
while spinning the optical disc in the second direction, read data from said second side of said dual sided optical disk after reading the stored portion of data from the memory.

30. The optical disk device according to claim 29, wherein said optical reader is rotatable to allow access to said second side of said dual sided optical disk.

31. The optical disk device according to claim 29, further comprising:
a transfer mechanism to flip said optical disk from said first side to said second side to enable said optical reader to read data from both sides of said disk.

32. The optical disk device according to claim 29, wherein said dual sided optical disk is a DVD.

33. A system for playing an optical disk comprising:
a processor;
a memory connected to said processor;
an output device; and
an optical disk device, said optical disk device comprising:
an optical reader capable of reading a dual sided optical disk,
processor cooperating with said optical disk reader and said memory to:
store a portion of data from a first side of said dual sided optical disk in said memory;
cause the disk reader to read data not included in said portion of data stored in said memory from said first side of said dual sided optical disk;
read said portion of data stored in said memory after reading said data not included in said portion of data stored in said memory;
switch said dual sided optical disk from said first side to a second side concurrently with said reading said portion of data stored in said memory; and
reading data from said second side of said dual sided optical disk after reading said portion of data stored in said memory.

34. The system according to claim 33, wherein said processor determines a point when reading said dual sided optical disk should be switched from said first side to said second side.

35. The system according to claim 34, wherein said portion of data stored in said memory comprises data from said determined point on said first side of said dual sided optical disk up to an end of said first side of said dual sided optical disk.

36. The system according to claim 35, wherein an amount of time required to read said portion of data stored in said memory corresponds to an amount of time required to switch reading of said dual sided optical disk from said first side to said second side.

37. The system according to claim 33, wherein said optical disk is a DVD.

38. The system according to claim 37, wherein said output device is a video display device.

39. A method for providing uninterrupted continuous playback of data read from a first and second side of a dual sided optical disk comprising:
spinning the optical disk in a first direction to enable reading data from the first side of the optical disk;
while spinning the optical disk in the first direction, reading a portion of data from the first side of the optical disk;
storing said portion of data from the first side of the optical disk in a memory;
while spinning the optical disc in the first direction, reading data from the first side of the optical disc not included in the stored portion of data;

reading from the memory the stored portion of data after reading the data not included in the stored portion of data;

switching the optical disk from the first side to the second side concurrently with reading the stored portion of data from the memory, said switching including spinning the optical disk in a second direction; and while spinning the optical disc in the second direction, reading data from said second side of said dual sided optical disk after reading the stored portion of data from the memory.

40. The method according to claim 39, wherein the stored portion of data includes data located at an end of the first side of the optical disk.

41. The method according to claim 39, wherein said reading and storing a portion of data from the first side of the optical disk further comprises determining an amount of data to be included in said portion of data from said first side to be stored in said memory.

42. The method according to claim 41, wherein said determining includes using a processor to determine an amount of data to be included in said portion.

43. The method according to claim 41, wherein an amount of time required to read the stored portion of data from the memory corresponds to an amount of time required to switch the optical disk from the first side to the second side.

44. The method according to claim 39, wherein switching the optical disk further comprises flipping the optical disk from the first side to the second side.

45. The method according to claim 39, wherein switching the optical disk further comprises moving an optical pickup from the first side of the optical disk to the second side of the optical disk.

46. The method according to claim 39, wherein switching the optical disk further comprises using a first optical pickup to read the first side of the optical disk; and using a second optical pickup to read the second side of the optical disk.

47. An apparatus for reading a first and second side of a dual sided optical disk comprising:

an optical disk reader capable of reading the first side of the optical disk while rotating the optical disk in a first direction around an axis and capable of reading the second side of the optical disk while rotating the optical disc in a second direction around the axis;

a memory connected to said optical disk reader; and a controller cooperating with said optical disk reader and said memory to:

store a portion of data from the first side of the optical disk in the memory;

cause the cause the disk reader to read data not included in said portion of data stored in said memory from said first side of said dual sided optical disk;

read the portion of data stored in the memory after reading said data not included in said portion of data stored in said memory;

switch the disk from the first side to the second side concurrently with said reading said portion of data stored in said memory; and reading data from said second side of the optical disk after reading said portion of data stored in said memory.

48. The apparatus according to claim 47, wherein the optical disk reader further comprises: an optical pickup, the optical pickup being adapted to move from the first side of the optical disk to the second side of the optical disk to switch reading from the first side to the second side.

49. By The apparatus according to claim 47, wherein said optical disk reader further comprises a first optical pickup to read data from the first side of the optical disk and a second optical pickup to read data from the second side of the optical disk.

\* \* \* \* \*

UNITED STATES PATENT AND TRADEMARK OFFICE
CERTIFICATE OF CORRECTION

PATENT NO.     : 6,504,798 B1
DATED          : January 7, 2003
INVENTOR(S)    : Paul A. Revis It is certified that error appears in the above-identified patent and that said Letters Patent is hereby corrected as shown below:

Column 2,
Line 29, "clocklwise" should be -- clockwise --;

Column 4,
Line 46, "tie" should be -- time --;

Column 5,
Line 55, "tie" should be -- the --;

Column 8,
Line 40, "13" should be -- 11 --;

Column 10,
Line 21, insert -- said -- before "processor";

Signed and Sealed this

Fifth Day of August, 2003

JAMES E. ROGAN
*Director of the United States Patent and Trademark Office*